United States Patent
Devaney

(10) Patent No.: US 6,357,045 B1
(45) Date of Patent: Mar. 12, 2002

(54) APPARATUS AND METHOD FOR GENERATING A TIME-MULTIPLEXED CHANNEL SURFING SIGNAL AT TELEVISION HEAD-END SITES

(75) Inventor: Patrick W. Devaney, Freehold, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/829,108

(22) Filed: Mar. 31, 1997

(51) Int. Cl.⁷ .................................................. H04N 7/16
(52) U.S. Cl. .................... 725/138; 725/38; 348/385; 348/564
(58) Field of Search ................................ 348/385, 731, 348/9, 7, 8, 386, 387, 385.1, 564; 455/6.3; 725/37, 38, 135, 138, 139

(56) References Cited

U.S. PATENT DOCUMENTS

| | | | | |
|---|---|---|---|---|
| 5,231,494 A | * | 7/1993 | Wachob | 358/146 |
| 5,331,414 A | * | 7/1994 | Golin | 348/390 |
| 5,359,674 A | | 10/1994 | van der Wal | |
| 5,532,748 A | | 7/1996 | Naimpally | |
| 5,534,944 A | * | 7/1996 | Egawa et al. | 348/584 |
| 5,537,152 A | * | 7/1996 | Ishikawa | 348/564 |
| 5,537,153 A | * | 7/1996 | Shigihara | 348/564 |
| 5,633,683 A | * | 5/1997 | Rosengren et al. | 348/564 |
| 5,682,195 A | * | 10/1997 | Hendricks et al. | 348/6 |
| 5,752,160 A | * | 5/1998 | Dunn | 455/5.1 |
| 5,847,703 A | * | 12/1998 | Teicher et al. | 345/327 |
| 5,926,230 A | * | 7/1999 | Niijima et al. | 348/564 |

* cited by examiner

Primary Examiner—Chris Grant
(74) Attorney, Agent, or Firm—Ratner & Prestia

(57) ABSTRACT

A method and apparatus that generates a time-multiplexed channel surfing signal at television head-end sites. The system includes circuitry that receives channel feeds which are analog signals or digitally encoded signals. The channel feeds are segmented and segments from each feed are combined to produce a combined channel feed which is transmitted with the channel feeds.

27 Claims, 12 Drawing Sheets

FIG. 13

Row 1: FEED M1 | FEED M2 | FEED M3 | FEED M4 | FEED M5 | FEED M6 | FEED M7 | FEED M1 | FEED M1 | ...

Row 2: 1100A | 1100B | 1100C | 1100D | 1100D | 1100A | 1100B | 1100C | 1100D | ...

APPARATUS AND METHOD FOR GENERATING A TIME-MULTIPLEXED CHANNEL SURFING SIGNAL AT TELEVISION HEAD-END SITES

FIELD OF THE INVENTION

The present invention generally relates to digital television and, more particularly, it relates to the generation of a time-multiplexed display of channels provided from the head-end of a transmission system.

BACKGROUND OF THE INVENTION

The basics of television are well known and described in numerous publications. For example, *Television Electronics: Theory and Service*, by Kiver and Kaufman (1983), which is herein incorporated by reference, describes, among other things, the basics of conventional analog television (see Chapters 7–10, pgs. 159–271). Additionally, the *Television Engineering Handbook* by Benson and Whitaker (1992), which is also herein incorporated by reference, describes digital television as well as High Definition Television (HDTV) (see Chapters 18 and 24, respectively).

Digital television, in view of its many advantages, is making great progress in its attempts to replace conventional analog television. This progress is driven by many groups and associations. One such association of companies driving digital television is known as the "Digital HDTV Grand Alliance" including members such as AT&T, Philips, David Sarnoff Research Center, Massachusetts Institute of Technology and others.

An overview of the strides made by this group are presented in an article by Robert Hopkins entitled "Digital Terrestrial HDTV for North America: The Grand Alliance HDTV System" published in the IEEE Transactions on Consumer Electronics (Summer 1994) (hereinafter "the Grand Alliance article"). This article is herein incorporated by reference for all of its teachings regarding the background and basics of digital HDTV systems including the use of Program and Transport Packet Streams.

Although the present invention is generally applicable to digital television and not just digital HDTV, the Grand Alliance article provides background material adequate to illustrate conventional systems and the problems associated therewith. In the Grand Alliance article, FIG. 1, also reproduced herein as FIG. 14, shows a high-level functional block diagram of the Grand Alliance HDTV System encoder. As shown, a video source delivers a video signal to the video compressor where video compression is accomplished in accordance with the MPEG-2 Video standard at the Main Profile/High Level. It should be noted that the problems cited in the article may exist with a Main Profile/Main Level system as well.

The video encoder produces variable-length packets of data called Packetized Elementary Stream (PES) packets. Similar processing occurs for the audio input signals. The video and audio PES packets, along with any ancillary data are presented to a multiplexer (also known as a Transport Multiplexer). The output of the multiplexer is a stream of fixed-length 188-byte MPEG-2 Transport Stream packets. The MPEG-2 Transport Stream packets are presented to the modulator such as a VSB modulator where data is encoded for the channel and a modulated carrier is generated.

After transmission, the signal is received and decoded and displayed on whatever channel the user has selected. In the above-described configuration, a serious drawback exists, however, such that when the user decides to change channels (also known as "channel surfing") a significant delay may occur between the time the user selects a new channel and when the digital HDTV signal for that channel is actually acquired and displayed on the screen. This delay can be as much as 1 to 2 seconds in duration and, for even the most novice channel surfers, quite annoying. This delay occurs due to the relatively complex decoding schemes implemented in a digital television receiver. This necessarily reduces the rate of channel surfing.

Further, the number of channels broadcast and available to users is increasing. Currently, satellite digital broadcast systems provide 150 channels. As a result, it will become physically taxing for a user to surf the entire space of programs.

Systems have been proposed to overcome these problems. For example, many cable systems provide a rolling-text style of on-screen program guide. Many user's perceive these guides as boring and of low information content.

Another system which has been proposed is described in U.S. Pat. No. 5,532,748, entitled HYBRID ANALOG/DIGITAL TELEVISION TRANSMISSION SYSTEM issued to Saiprasad V. Naimpally and is incorporated herein by reference. This patent describes a system for including an analog video signal along with the digital television signal to produce a hybrid television signal for use during channel change. This system does not address the physical problems associated with constant button pushing to change channels, nor does it allow digital systems to retain the high quality picture during channel surfing which users have become to expect from analog systems.

SUMMARY OF THE INVENTION

The invention is directed to a method and apparatus that generates a time-multiplexed channel surfing signal at television head-end sites. The system includes circuitry that receives channel feeds which are analog signals or digitally encoded signals. The channel feeds are segmented and segments from each feed are combined to produce a combined channel feed which is transmitted with the channel feeds.

The invention is also directed to the generation of the channel feed from the head-end of a transmission system.

The invention is further directed to a head-end delivery system where the combined channel feed may be delivered by a variety of delivery methods including digital broadcast, analog broadcast, and/or transmission via the internet. Each delivery means uses a different back-end.

The invention is also directed to optional receiver control codes, placed into the side information of the time-multiplexed digital signal. The optional receiver control codes provide added features such as one-button jump to current surfing channel for receivers equipped to decode these control codes.

BRIEF DESCRIPTION OF THE DRAWINGS

FIG. 13 a timing diagram useful for describing the display formats shown in FIG. 10.

DETAILED DESCRIPTION

Overview

Figure 1:
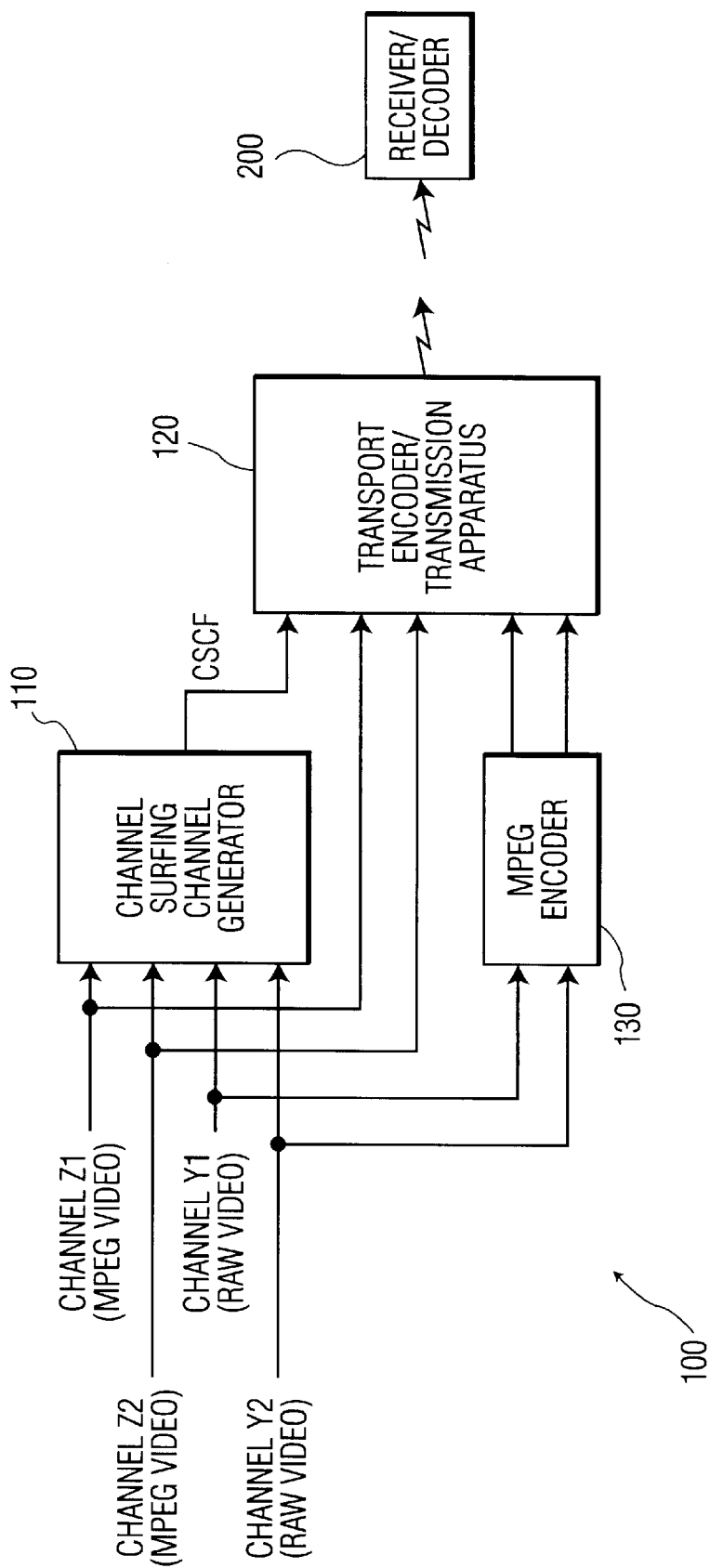
FIG. 1 is a block diagram of a system for transmitting and receiving MPEG transmissions including a channel surfing signal generator that generates a time-multiplexed channel surfing signal according to an exemplary embodiment of the present invention.

The present invention automates the channel surfing process to provide robust channel surfing. This is accomplished by producing a time-multiplexed display of channels to be transmitted. In other words, segments from a number of different channel feeds are combined to generate a surfing channel for transmission to the user. The surfing channel displays each of the segments sequentially and/or in a matrix screen format. As a result, the user avoids delays that would be encountered by switching from channel to channel. Further, the user is not required to repeatedly select new channels. When using a matrix screen format, the user can view scenes from a number of different channels at one time. Finally, the invention does not require modification to the receiver because the signal creation, the generation of the channel surfing channel, is performed at the head-end.

When optional control codes are embedded in the digital side information packets, some software decoding capability is provided in the receiver. The additional features enabled by the control codes are integrated with other receiver features such as channel "blocking" or "lockout". Given the control codes, one skilled in the art of decoding television signals can construct a receiver to operate in response to the control codes.

The invention also allows the operator at the head-end to define and control the generation of the channel surfing channel. For example, the operator can define the amount of time each channel is displayed during the surfing cycle. Each channel may be allocated the same amount of display time or each channel may be allocated a different amount of display time. Variability of the display time allows the operator to promote selected channels. In addition, the operator may insert commercials, station logos, or other information into the surfing cycle. In this case, the operator can also control the display time allocated to each of the inserts. In the case of a matrix display, for example, one of the display blocks may be dedicated to commercials/logos.

In addition to digital delivery of the channel surfing channel, the channel surfing channel can be provided as an analog channel by changing the back end of the invention. That is, instead of digitally encoding analog channels prior to creating a combined digital stream, the analog channel surfing channel is created by decoding digital channels to analog and combining channels by a simple analog switcher. The analog channel feed is broadcast with existing equipment as is known.

The channel surfing channel may also be delivered via the internet in digital form at a reduced bandwidth. In this case, the back-end would reduce the bandwidth by down sampling the images provided by the channel feeds. The down sampled images are digitally encoded and transmitted to, for example, a web-site where the channel surfing channel would be available on-demand in real time. The capability for on-demand internet video is known and offered by companies such as Progressive Networks under the names Real Audio™ and Real Video™.

FIG. 1 is an overall block diagram of the exemplary embodiment. At the head-end 100, a number of channel feeds Y1, Y2, Z1, and Z2 are provided to a channel surfing signal generator 110 which combines segments from each of the channel feeds Y1, Y2, Z1, and Z2 to produce a channel surfing channel feed CSCF that is provided to a transport encoder/transmission apparatus 120. The channel surfing signal generator combines raw video channel feeds Y1 and Y2 that are, for example, in an analog format with digital channel feeds Z1 and Z2 that are in, for example, MPEG-2 standard format. The MPEG-2 standard is described in an International Standard (IS) publication entitled, "Information Technology Generic Coding of Moving Pictures and Associated Audio, Recommendation H.626", ISO/IEC 13818-2, IS, November 1994 which is available from the ISO and which is hereby incorporated by reference for its teaching on the MPEG-2 digital video coding standard. The channel surfing channel feed CSCF is also an MPEG-2 coded signal.

Before channel feeds Y1 and Y2 are provided to the transport encoder/transmission apparatus 120, channel feeds Y1 and Y2 are converted to MPEG-2 format using MPEG-2 encoder 130. The transport encoder/transmission apparatus 120 combines the different channel feeds Y1, Y2, Z1, Z2, and CSCF that are in MPEG-2 format and transmits the combined signal to a receiver/decoder 200 located at, for example, a user's home. Alternatively, channel feeds Y1 and Y2 may be transmitted without conversion to the MPEG-2 format.

When the user selects a channel for display, receiver/decoder 200 decodes the received transmission and displays video from the selected channel. Thus, if the user desires to channel surf, the user selects the channel surfacing channel which automatically scans through the channels or some subset thereof, corresponding to channel feeds Y1, Y2, Z1, and Z2 broadcast from the head end 100.

Description of Exemplary Embodiments

Figure 2:
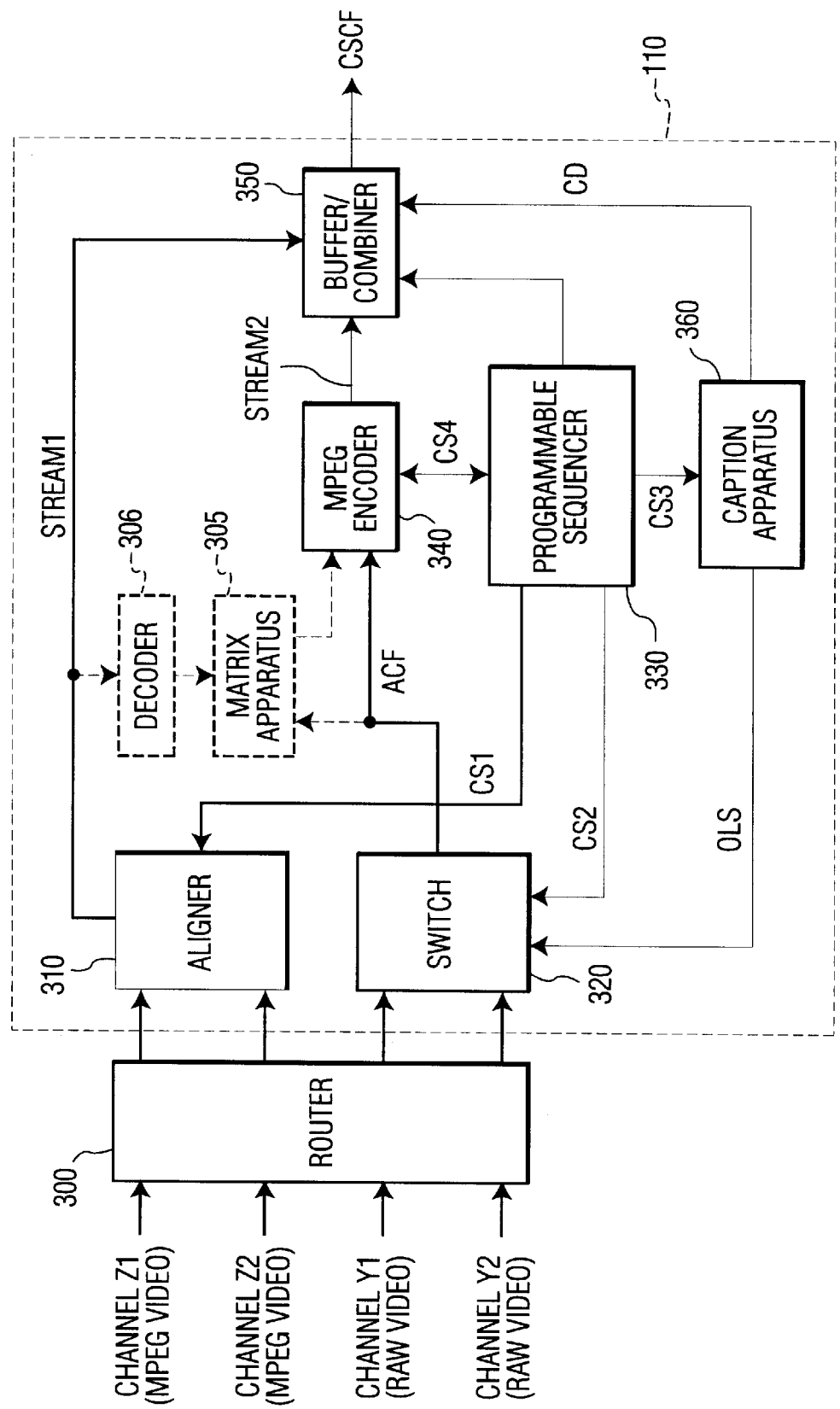
FIG. 2 is a block diagram of the channel surfing signal generator shown in FIG. 1.

Referring now to the drawings, wherein like reference numerals refer to like elements throughout, FIG. 2 shows the channel surfing signal generator 110. The channel surfing signal generator 110 is provided analog channel feeds Y1 and Y2 and MPEG encoded channel feeds Z1 and Z2. One or more of the channel feeds may be programs and/or commercials provided to the head-end site for inclusion in the channel surfing channel. Alternatively, one or more of the channel feeds may be generated at the head-end. For example, the operator at the head-end may provide station logos, local information, local weather, and/or commercials in the channel feeds to be included in the channel surfing channel. This provides flexibility to the operator at the head-end to define and control the generation of the channel surfing channel.

The channel feeds Y1, Y2, Z1, and Z2 are routed by the router 300 to the aligner 310 and the switch 320. The router 300 can be a video switch that directs an input signal to a specific output port or it can be connectors that couple an input signal directly to either the aligner 310 or switch 320. Although the router 300 is shown separate from the channel surfing signal generator 110 in FIG. 2, the router 300 can be incorporated into the channel surfing signal generator 110.

The aligner 310 stores segments of the MPEG channel feeds Z1 and Z2 so that a suitable segment of either of the MPEG channel feeds Z1 and Z2 can be provided to the combiner 370. As is described in greater detail below, the MPEG encoded channel feeds Z1 and Z2 are held in aligner 310 to ensure that the MPEG encoded channel feeds Z1 and Z2 can be accessed at a selected picture boundary and combined. The MPEG encoded channel feeds Z1 and Z2 are provided from aligner 310 to buffer/combiner 350 in response to control signal CS1 from the programmable sequencer 330. The buffer/combiner is used to combine digitally encoded signals without converting the digital signals to analog as is described below.

The MPEG-2 standard defines a complex syntax which contains a mixture of data and control information. Some of this control information is used to enable the signals having several different formats to be covered by the standard. These formats define images, having differing numbers of picture elements (pixels) per line, differing numbers of lines per frame or field and differing numbers of frames or fields per second.

In addition, the basic syntax of the MPEG-2 Main Profile defines the compressed MPEG-2 bit stream representing a sequence of images in five layers, the sequence layer, the group pictures layer, the picture layer, the slice layer, and the macroblock layer. Each of these layers is introduced with control information and "stuffing" characters. The stuffing characters are inserted as needed to ensure that the data rate of the input data stream matches the rate at which pictures are displayed. Finally, other control information, also known as side information, (e.g. frame type, macroblock pattern, image motion vectors, coefficient zig-zag patterns and dequantization information) are interspersed throughout the coded bit stream.

To effectively receive the digital images, a decoder should recognize the control portions, extract the necessary control information, and use the extracted data to process the video signal information. One piece of information that is specified for each sequence layer is the video buffering verifier (VBV) buffer size. The VBV buffer size value specifies a number of bits of input data from the video sequence which must be stored in the input buffer of the decoder before the video sequence may be decoded. If this number of bits is stored when the decoding operation begins, the input buffer will neither become too full (overflow) or become empty (underflow) during the processing of the video sequence.

If splicing is not done at a sequence boundary then the data already resident in the input buffer may not be read from the buffer for processing until the buffer overflows due to the new data from the inserted sequence. Alternatively, the data already resident in the input buffer may cause the decoder to prematurely indicate that the VBV buffer size criterion has been met. In this instance, the decoder may cause the input buffer to either overflow or underflow in the processing of the stored data.

These problems are overcome to allow another MPEG sequence, the inserted sequence, to be inserted at any picture boundary in a MPEG main sequence. The main sequence and the inserted sequence are from separate MPEG encoded channel feeds, for example, channel feeds Z1 and Z2. The main sequence is the sequence into which another sequence, the inserted sequence, is inserted. The main and inserted sequences are analyzed to determine a number of stuffing characters to insert in the data stream after the selected picture boundary and before the inserted sequence. The stuffing characters are ignored during the decoding operation and allow the input buffer to be emptied to a level compatible with the inserted sequence. This number of stuffing characters is determined from the data rates of the main sequence and the inserted sequence and the intervals between respective points in time corresponding to the start of the insertion and the next decoding time stamps in both the main and inserted sequences.

In order to implement this process, the MPEG encoded channel feeds Z1 and Z2 are held in aligner 310 to ensure that the MPEG encoded channel feeds Z1 and Z2 can be accessed at a selected picture boundary. Further, by storing the signals or providing a compensatory delay using aligner 310, the stored signals may be accessed twice, once to determine splicing parameters and again to perform the actual splicing operation. The determination of the splicing parameters and the actual splicing operation are described in greater detail in U.S. Pat. No. 5,534,944 entitled METHOD OF SPLICING MPEG CODED VIDEO and issued to Egawa et al., which is incorporated herein by reference for its teachings on splicing compressed video signals which have been encoded according to the MPEG-2 standard.

Returning to FIG. 2, the buffer/combiner 350 inserts the data stream STREAM1 of the MPEG channel feeds Z1 and Z2 into data stream STREAM2 provided from the MPEG encoder 340. Data stream STREAM2 is the MPEG encoded version of the analog channel feeds Y1 and Y2. In other words, the inserted sequences are provided from the data stream STREAM1 and inserted into a main sequence provided from the data stream STREAM2. Alternatively, the buffer/combiner 350 may insert the selected sequences from data stream STREAM2 into data stream STREAM1. The buffer/combiner 350 also provides the same operations as aligner 310 for storing segments of the data stream STREAM2. An exemplary combiner 350 is described in the above-referenced patent to Egawa et al.

The analog channel feeds Y1 and Y2 are provided to the switch 320 which selects one of the channel feeds Y1 or Y2 in response to control signal CS2. The selected analog channel feed Y1 or Y2 is provided to MPEG encoder 340 to produce the encoded analog stream STREAM2. The encoded analog stream STREAM2 is provided to the buffer/combiner 350 to produce the channel surfing channel feed CSCF. The channel surfing channel feed is a combination of channel feeds Y1, Y2, Z1, and Z2 or some subset thereof.

For example, there may be a news channel surfing channel, sports channel surfing channel, a children's channel surfing channel, and/or an education channel surfing channel. The program content of a channel surfing channel is selected by the operator at the head-end and provided to the programmable sequencer 330. The programmable sequencer 330 controls the other components of the channel surfing channel generator 110 to produce the channel surfing channel selected by the operator.

Multiple channel surfing channels may be produced by providing two or more channel surfing channel generators 110. Alternatively, two or more of the components of the channel surfing channel generator 330 may be included in the channel surfing channel generator for producing multiple channel surfing channels. For example, two or more aligners 310, switches 320, MPEG encoders 340, and combiner/buffers 350 may be controlled by one programmable sequencer 330 to produce multiple channel surfing channels.

In order to prevent an overflow of buffers and to provide a high quality picture for the channel surfing channel, the programmable sequencer 330 controls the encoding process via signal CS4 implemented by the MPEG encoder 340 to determine when to switch from one analog channel feed Y1 to the other analog channel feed Y2 using switch 320. An MPEG encoded channel feed includes intra-frame encoded (an I-frame) macroblocks, predictively encoded (a P-frame) macroblocks or bidirectionally encoded (a B-frame) macroblocks. A macroblock is intra coded if it is coded using only information from a single frame or field. The P-frame and B-frame coded macroblocks are predictively coded. A macroblock is predictively coded if it is coded using motion compensated prediction from past reference fields or frames (a P-frame) or coded using motion compensated prediction from past and/or future reference fields or frames (a B-frame).

The MPEG encoder 340 produces I-frame, P-frame, and B-frame encoded macroblocks. Because the P-frames and the B-frames are coded using information from past and/or future reference frames, the programmable sequencer 330 switches between the analog channel feeds Y1 and Y2 when the encoded macroblock type produced by MPEG encoder 340 is an I-frame. For example, the programmable sequencer 330 switches between the analog channel feeds Y1 and Y2 at the group of pictures layer in the MPEG sequence because an I-frame always follows a group of pictures header. In this way, the first frame or field of the newly selected analog channel feed Y1 or Y2 is encoded using information from a single frame or field. As a result, the MPEG encoder 340 does not predictively encode a frame or field from one analog channel feed based on data from a frame or field of another analog channel feed. The operation of the programmable sequencer 330 is described in greater detail below.

Figure 3:
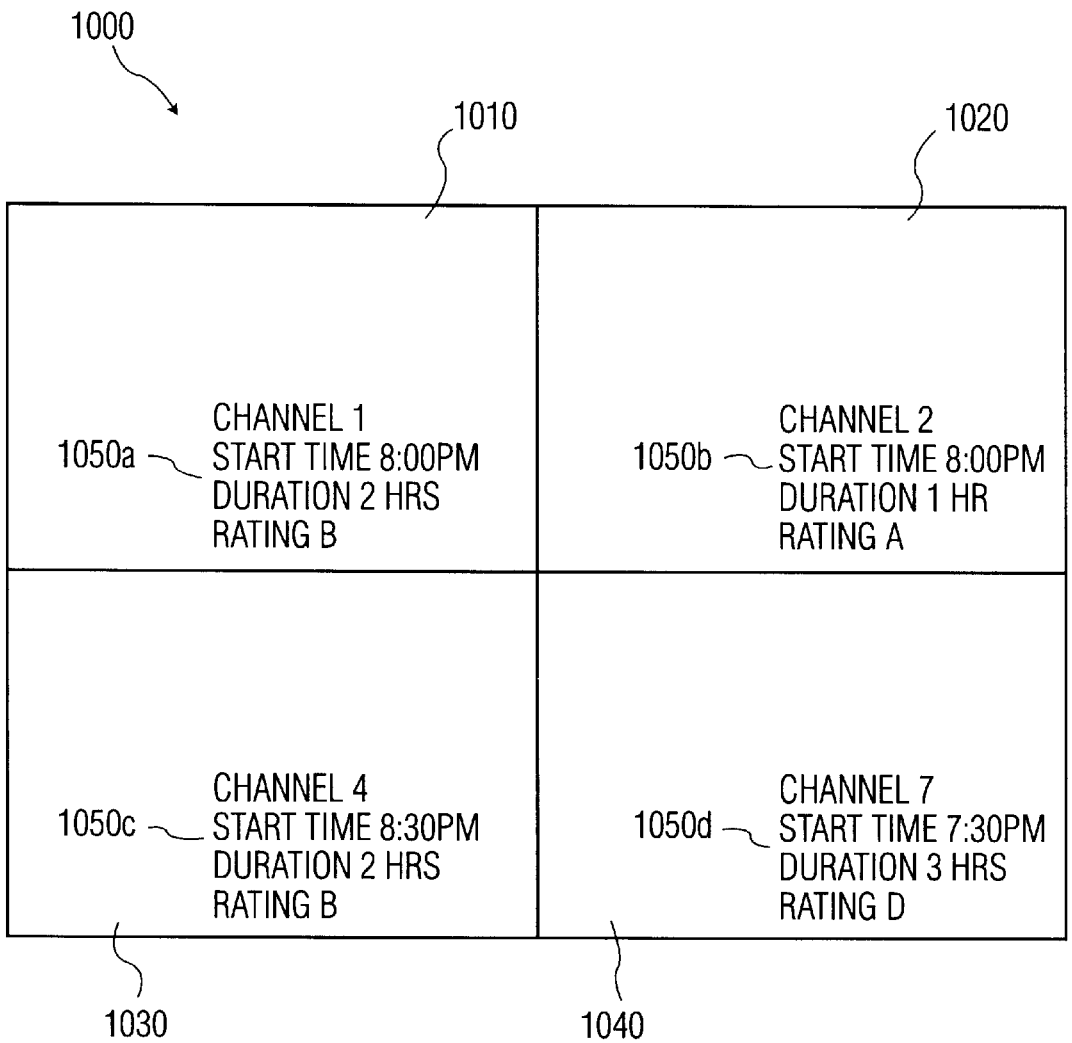
FIG. 3 is an illustration of a display format useful for explaining the operation of the channel surfing signal generator shown in FIG. 2.

The exemplary channel surfing signal generator 110 also includes a caption apparatus 360 which provides information to be overlaid on the scenes to be displayed corresponding to each of the channel feeds Y1, Y2, Z1, and Z2 in the channel surfing channel feed CSCF. For example, the channel number, start time, duration, and rating of the show being provided by each of the channel feeds Y1, Y2, Z1, and Z2 can be viewed when the video corresponding to the channel feeds Y1, Y2, Z1, and Z2 is displayed. An exemplary display 1000 is shown in FIG. 3. The channel surfing channel displays a matrix of four programs 1010 through 1040 simultaneously providing program information 1050a through 1050d for each of the four programs 1010 through 1040. The generation of the matrix display is described below.

In addition, channel data (CD) can be added to the channel surfing channel feed CSCF which allows the user to switch from the sequence of a picture currently being displayed on the channel surfing channel to the channel that is currently displaying the program. For example, if the program corresponding to channel 6 is currently being displayed on the channel surfing channel, the user can switch to channel 6 by pressing a button on a controller 1200 (shown in FIG. 9) that operates the receiver 200(shown in FIG. 1). The addition of the program data and the channel data to the channel surfing channel feed CSCF is described below with reference to FIG. 4.

Figure 4:
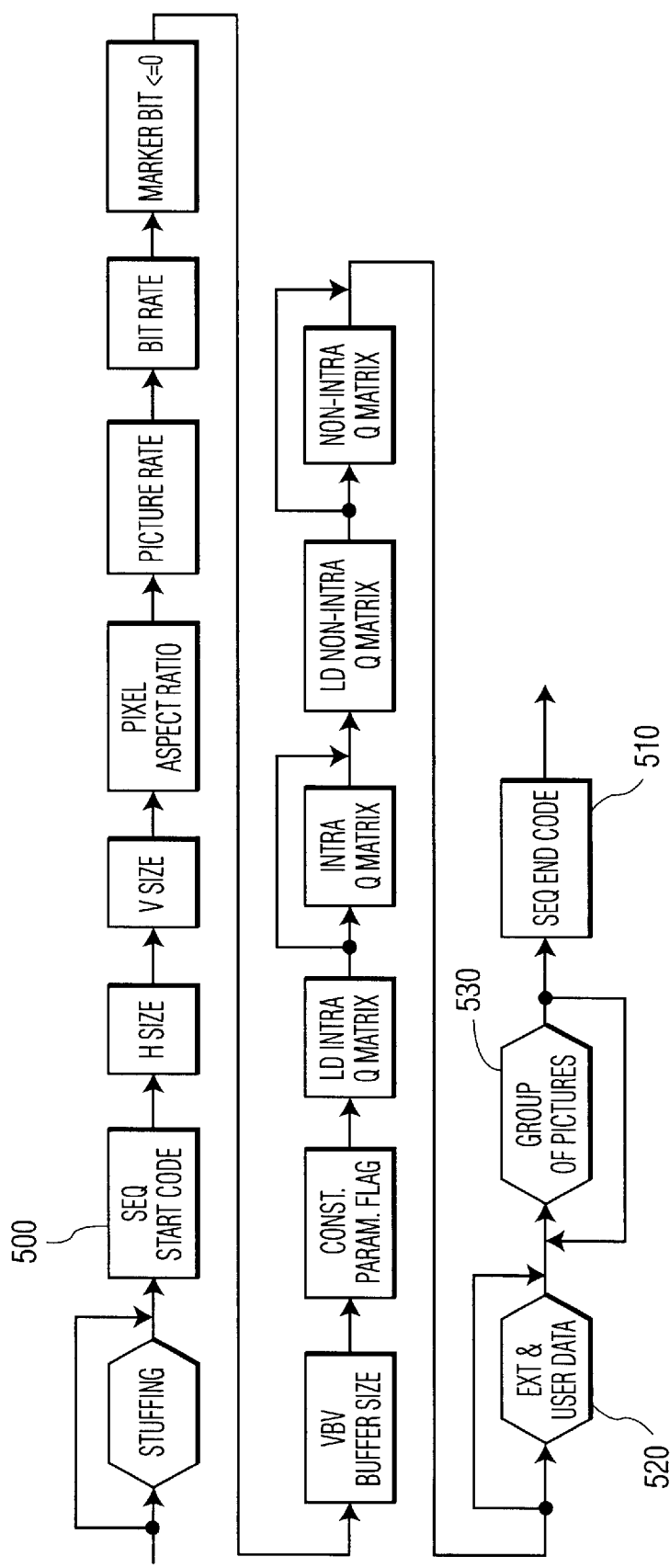
FIG. 4 is a diagram that defines the syntax of the sequence layer in the MPEG-2 Standard.

FIG. 4 defines the syntax of the sequence layer. In the MPEG-2 description, a sequence defines a series of images which includes at least one group of pictures. The sequence is defined by a sequence start code 500 followed by a set of parameters to be used for the data for one or more groups of pictures and a sequence end code 510. A detailed description of all of these parameters is omitted because it is not needed to describe the present invention.

One of the parameters provided is the extension and user data 520. Extension data is defined by a start code of 0x000001B5 (hexadecimal). A start code indicates that the following data in the bit stream is extension data. The extension data follows the start code and continues until another start code is encountered. One start code which may be encountered is the user data start code. In the MPEG-2 standard this is defined as the bit string 0x000001B2. This code identifies the beginning of user data. As with the extension data, this data continues until the receipt of another start code.

The extension and user data 520 are provided to allow for expansion and customization of the MPEG-2 standard. As indicated by the arrow bridging block 520, this data is optional. Data included in the extension and user data 520 are 8-bit integers where an arbitrary number of the 8-bit integers may follow one another. After the extension and user data 520 are one or more groups of pictures 530. As indicated by the backwards arrow bridging item 520 in the syntax diagram, multiple groups of pictures 530 may be defined in this part of the sequence syntax. Following the final group of pictures is a sequence end code 510.

In the exemplary embodiment, program data is included in the user data to allow overlays of the programs to be displayed on the channel surfing channel. In addition, as described above, channel data may also be included to provide for channel jumping from the channel surfing channel to a channel corresponding to the program segment being displayed on the channel surfing channel. The channel data and the program data are extracted from the bit stream by the receiver/decoder 200, shown in FIG. 1. The extracted data provides a series of instructions to the receiver/decoder 200. For the program data, the receiver/decoder 200 adds captions or overlays for the pictures to be displayed on the channel surfing channel. For the channel data, the receiver/decoder 200 is provided with instructions for switching from the channel surfing channel to the channel which is displaying the corresponding picture, i.e., one button switching.

The receiver 200 (shown in FIG. 1) is programmed to extract and use the channel data. The additional features such as one button switching are integrated with other receiver features such as channel "blocking" or "lockout". For example, if the user at the receiver has specified that certain channels are "blocked" or "locked out", the one button switching may be integrated with these features so that the "lockout" or "block" may not be defeated by switching from the channel surfing channel using the one button switching feature. In addition, the segment to be displayed on the channel surfing channel corresponding to the "locked out" of "blocked" channels may also be blanked so they cannot be viewed.

Figure 9:
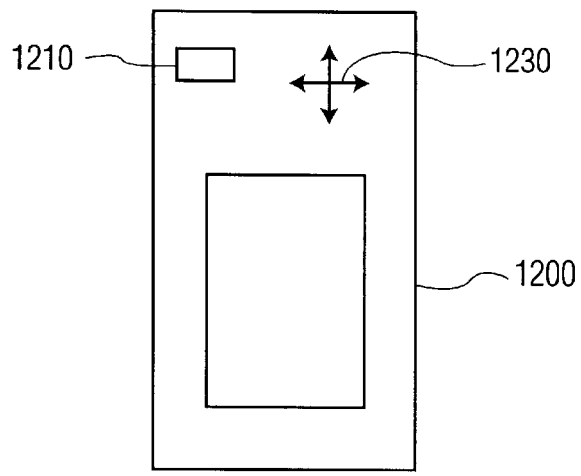
FIG. 9 is a schematic diagram of a controller according to an exemplary embodiment of the invention.
Figure 10:
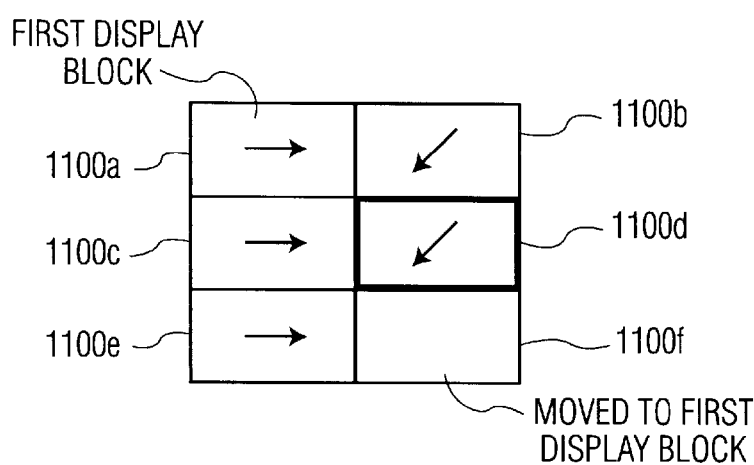
FIGS. 10 through 12 are illustrations of display formats useful for explaining the operation of the channel surfing signal generator shown in FIG. 2 and the controller shown in FIG. 9.
Figure 11:
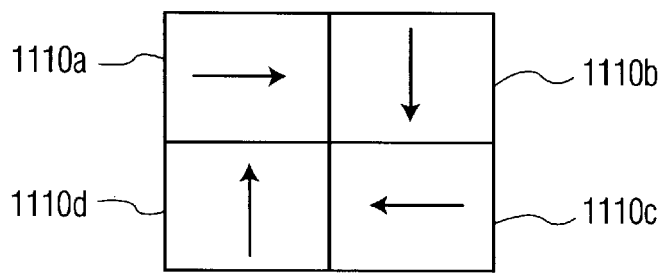
Figure 12:
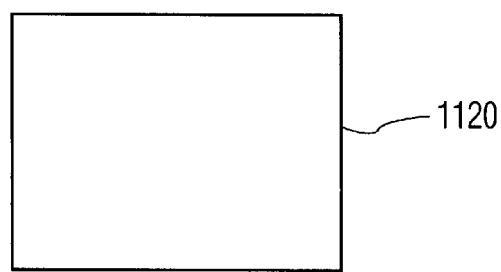
Figure 14:
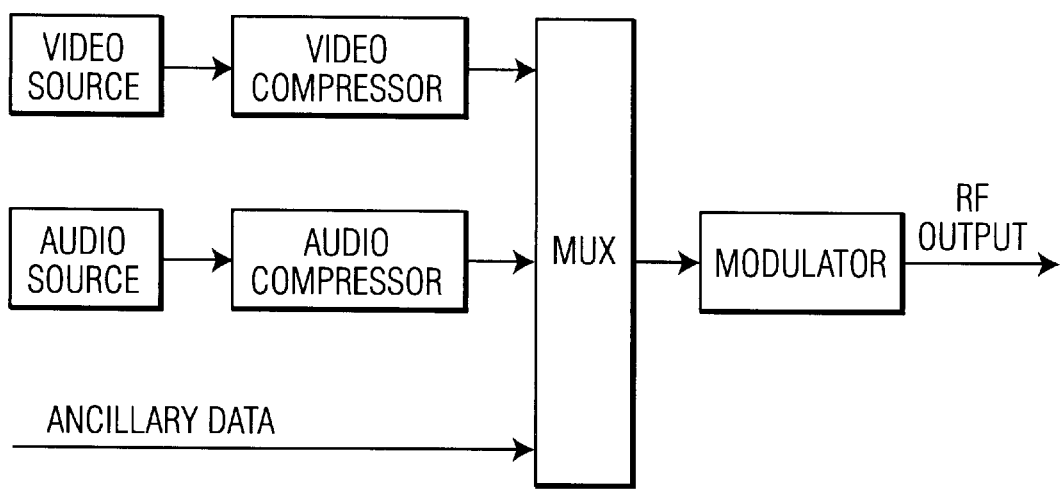
FIG. 14 is a block diagram of an encoder according to the prior art.

For example, FIGS. 10 through 12 illustrate three different display formats for the channel surfing channel. FIGS. 10 and 11 are matrix screen display formats. FIG. 10 illustrates display blocks 1100a–1100f for displaying six different channel feeds at the same time. As is shown in FIG. 9, a user operates controller 1200 to select a program displayed in one of the display blocks 1100a–1100f on the channel surfing channel by the receiver/decoder 200 (shown in FIG. 1). For example, the user can use directional control 1230 to select display block 1100d. The user jumps from the program shown in display block 1100d to the channel displaying the program of display block 1100d by activating button 1210. Similarly, the same operations are used for the four display blocks 1100a through 1100d shown in FIG. 11. In this case, however, the user selects from among four display blocks 1100a–1100d at a time.

In FIG. 12, only one program 1120 is displayed at a time on the channel surfing channel. In this case, the user does not have to select a program. The user jumps to the channel displaying the program 1120 on the channel surfing channel by activating button 1210 when that program is displayed on the channel surfing channel.

The matrix display is produced by the matrix apparatus 305 and the decoder 306. The decoder 306 decodes the digitally encoded data stream STREAM1 to produce an analog channel feed ACF2. The analog channel feeds ACF1 and ACF2 are provided to the matrix apparatus 305 which reduces the resolution of the images from the analog channel feeds ACF1 and ACF2. The total number of pixels to display an image is reduced by reducing the resolution of the image. For the display shown in FIG. 3, the resolution of each channel feed is reduced by half. In other words, the number of horizontal scan lines and the number of pixels per horizontal scan line in an image are each reduced by half.

The reduced resolution channel feeds can be produced using a filter (not shown) that produces Gaussian images which are reduced resolution images from the channel feeds. One system for producing reduced resolution Gaussian images is described in U.S. Pat. No. 5,359,674, entitled PYRAMID PROCESSOR INTEGRATED CIRCUIT, issued to van der Wal, which is herein incorporated by reference. The reduced resolution images produced by the filter are stored in a memory (not shown). The matrix apparatus 305 retrieves the images from the memory in a multiplexing fashion. For example, if first, second, third, and fourth stored images are stored in the memory, the matrix apparatus 305 combines these images to produce the matrix display shown in FIG. 3.

The matrix apparatus 305 alternatively retrieves scan lines from the first and second stored images to produce the upper section, programs 1010 and 1020 (shown in FIG. 3) of the matrix display. In this case, the first horizontal scan line from the first and second stored images are consecutively combined to produce the first horizontal scan line of the matrix display. This process is repeated for each of the horizontal scan lines in the first and second images and for the scan lines in the third and fourth images to complete the matrix display. In this exemplary embodiment, the buffer/combiner 350 does not combine the data stream STREAM1 and data stream STREAM2 because they have already been combined by the matrix apparatus to produce the matrix display.

Alternatively, the matrix apparatus 305 may combine only the channel feeds Y1 and Y2 (shown in FIG. 2) as they are provided in the analog channel feed ACF1 to produce the matrix display. In this case, the digitally encoded channel feeds from data stream STREAM1 are displayed as an entire display as shown in FIG. 12 on the channel surfing channel. The channel feeds from the analog channel feed ACF1 are displayed as a matrix display on the channel surfing channel. In other words, the channel surfing channel alternates between a full screen display as shown in FIG. 12 and a matrix display as shown in, for example, FIG. 3.

Figure 5:
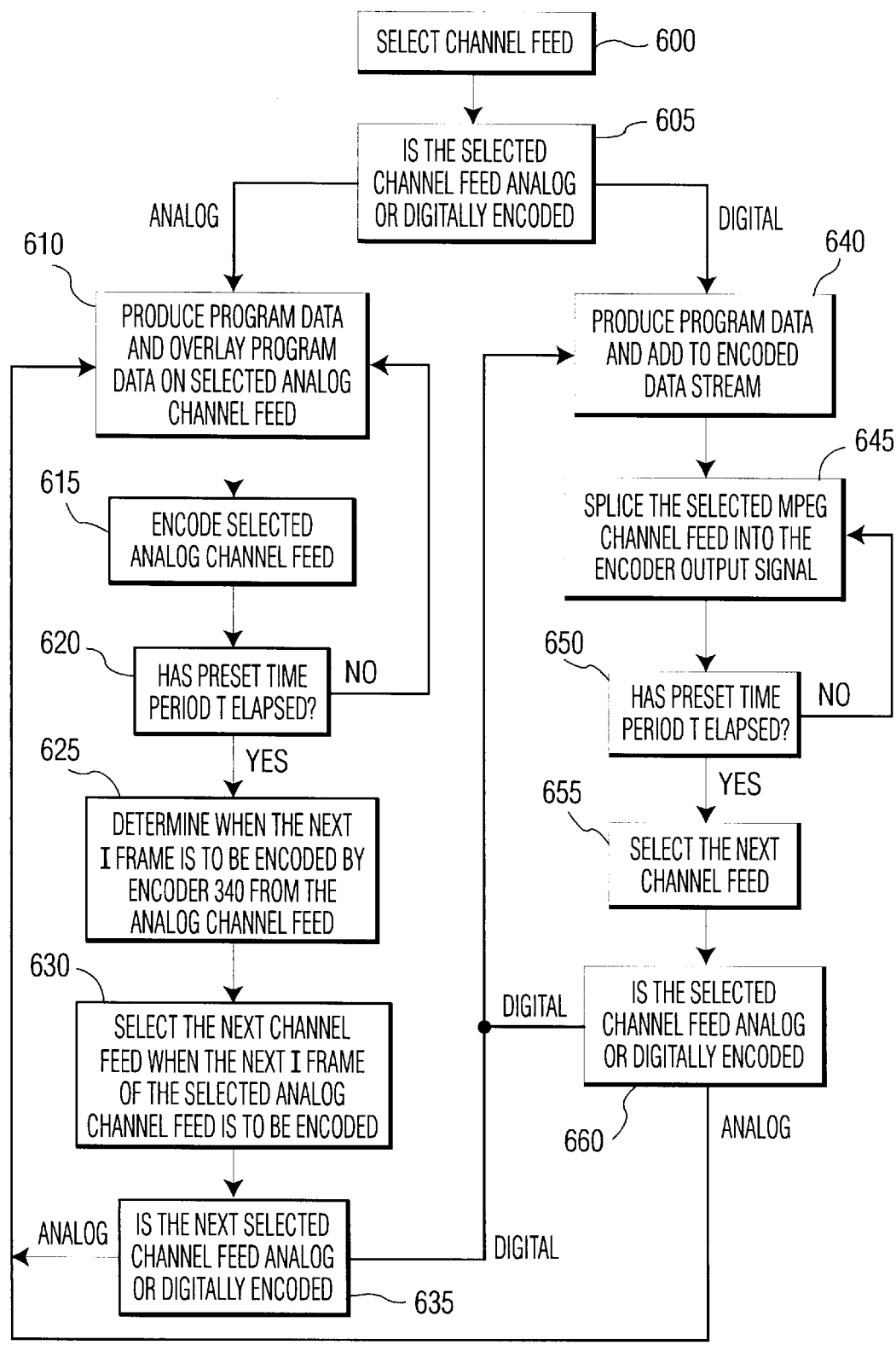
FIG. 5 is a flowchart diagram useful for explaining the operation of the programmable sequencer shown in FIG. 2.

FIG. 5 is a flowchart diagram that is useful for describing the operation of the programmable sequencer 330 (shown in FIG. 2). The programmable sequencer 330 controls the operation of the other components in the channel surfing signal generator 110. At step 600, the programmable sequencer selects 330 one of the channel feeds Y1, Y2, Z1, and Z2. The programmable sequencer 330 selects the channel feeds to arrange the order in which respective pictures from the channel feeds Y1, Y2, Z1, and Z2 are to be displayed from the channel surfing signal.

Figure 6:
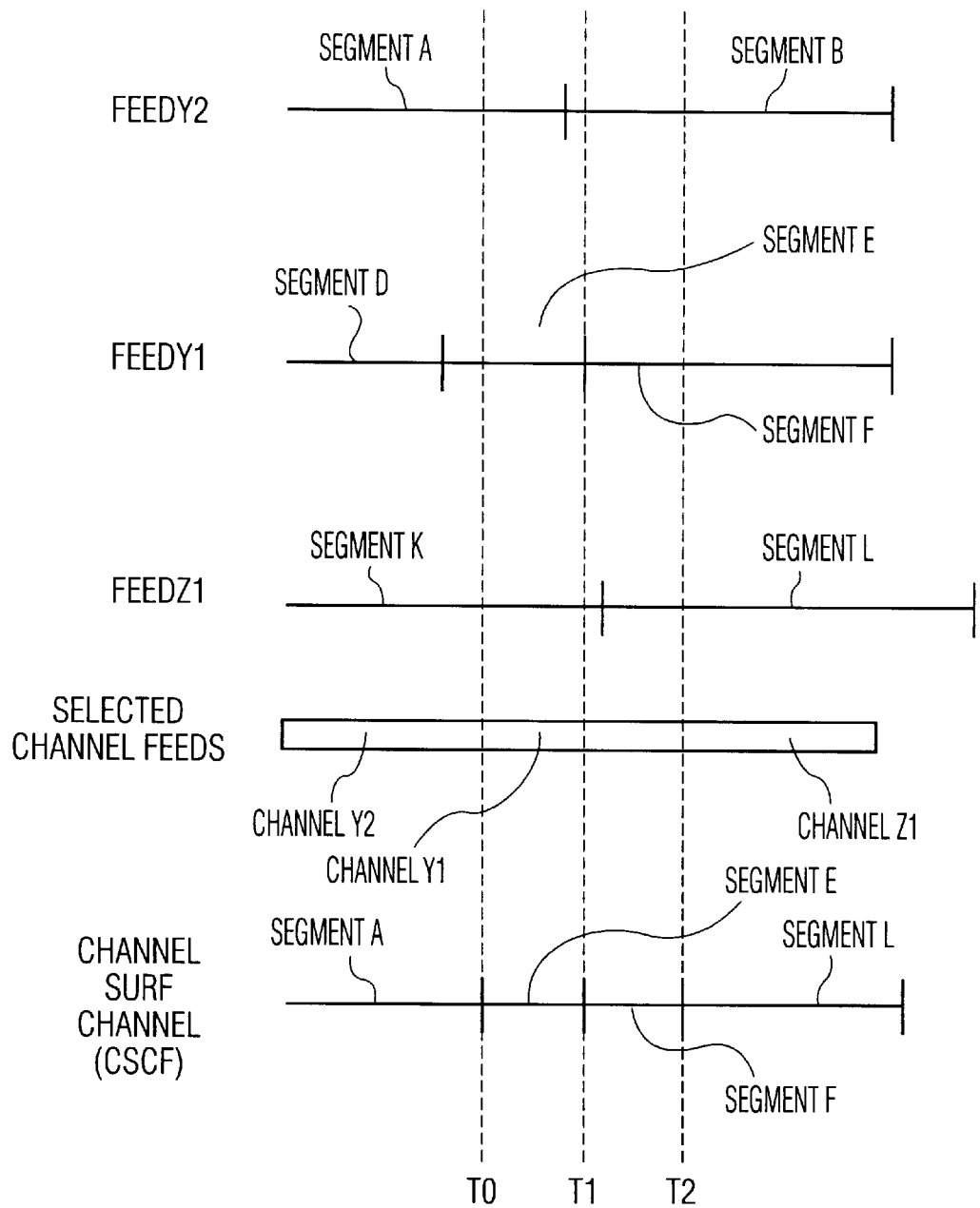
FIG. 6 is a timing diagram useful for explaining the operation of the channel surfing signal generator shown in FIG. 2.

For example, FIG. 6 is a timing diagram illustrating the pictures provided by the channel feeds Y1, Y2, and Z1. The channels feeds Y1, Y2, and Z1 include picture segments. For example, channel feed Y1 can include a portion of a movie (segment D) followed by a commercial (segment E) followed by a news brief (segment F). If the selected display order of the channel feeds is Y2, Y1, and Z1, then, as shown in FIG. 6, the channel surfing channel feed CSCF includes segments A, E, F, and L, in that order. The segment A is from channel feed Y2, the segments E and F are from channel feed Y1 and the segment L is from channel feed Z1. The programmable sequencer repeats the selection process to provide a continuous display of the segments from each of the channel feeds.

FIGS. 10 through 12 illustrate how the selected pictures are displayed by the receiver/decoder 200. FIG. 10 illustrates that six programs are displayed at a time. As is indicted by the arrows, the programs are displayed in order of display block 1100a to 1100f. All of the pictures corresponding to each of the channel feeds may not be displayed at the same time if there are more than six channel feeds in the channel surfing channel. FIG. 13 illustrates how eight different channel feeds M1 through M8 are displayed over a period of time in display blocks 1100a through 1100f.

FIG. 11 illustrates another display where only four display blocks 1110a through 1110d are displayed at a time. As is indicted by the arrows, the programs are displayed in order of display block 1110a to 1110d. FIG. 12 illustrates another display where pictures from only one channel feed are displayed at a time.

Returning to FIG. 5, at step 605, it is determined whether the selected channel feed Y1, Y2, Z1, or Z2 is analog or digitally encoded. The channel feeds Y1, Y2, Z1, and Z2 are processed differently depending on whether the channel feeds are digitally encoded or analog. At step 610, if the selected channel feed is analog, the programmable sequencer 330 provides a control signal CS2 to switch 320 to select the selected analog channel feed Y1 or Y2. The programmable sequencer 330 also provides a control signal CS3 to caption apparatus 360 to produce program data. The program data is provided to switch 320 via overlay signal OLS. This data is added as a caption or overlay to the analog channel feed Y1 or Y2 by switch 320.

As discussed above, the program data includes information about the video provided in the selected channel feed. Alternatively, the program data can be provided to buffer/combiner 350 via signal CD which adds, as described above, the program data to the user data 520 (shown in FIG. 4) for the selected channel feed. In either case, when the receiver/decoder displays the video corresponding to the selected channel feed on the channel surfing channel, the program data is also displayed to provided information to the user regarding the currently displayed video.

In addition, the programmable sequencer 330 provides channel data to buffer/combiner 350 to be added to the user data 520 (shown in FIG. 4) as described above. At step 615, the selected analog channel feed ACF1, channel feed Y1 or Y2, provided from switch 320 is encoded by MPEG encoder 340 to produce the encoded data stream STREAM2. The data stream STREAM2 is provided to buffer/combiner 350 where program data and channel data are added as user data 520 (shown in FIG. 4). The data stream STREAM2 is then provided as the channel surfing channel feed CSCF.

At step 620, it is determined whether the preset time period T has elapsed. The preset time period T is a period of time that the video from the selected channel feed is to be displayed on the channel surfing channel. Step 610 is repeated if the preset time period T has not elapsed. In other words, the current selected analog channel feed Y1 or Y2 is continually provided as the analog channel feed ACF1 until the preset time period T has elapsed. If the display includes mixed full size and matrixed partial frame images, partial frame images may be displayed for N*T where N is the number of partial images in the matrix.

The specified period T may be variable for different channel feeds allowing the operator at the head-end to define the amount of time each channel is displayed during the surfing cycle. Each channel feed may be allocated the same amount of display time or each channel may be allocated a different amount of display time. Variability of the display time allows the operator to promote selected channels. As described above, the operator may insert commercials, station logos, local whether, and/or other information into the surfing cycle for display. In this case, the operator may also control the display time allocated to each of the inserts. In the case of a matrix display, for example, one of the display blocks may be dedicated to the constant display of commercials, station logos, weather, or other information.

At step 625, if the preset time period T has elapsed, it is determined when the next I-frame is to be encoded by encoder 340 from the analog channel feed ACF1. Alternatively, as described above, it is determined when the next group of pictures 530 (shown in FIG. 4) occurs. An I-frame occurs after the group of pictures header in the group of pictures 530. In other words, the currently selected channel feed, for example channel feed Y2, is provided as the analog channel feed ACF1 until an I-frame is to be encoded even though the preset time period T has elapsed. At step 630, the next channel feed is selected when the next I-frame of the selected analog channel feed is to be encoded.

At step 635, it is determined whether the next selected channel feed is an analog signal or a digitally encoded signal. Step 610 is repeated if the next selected channel feed is analog. Otherwise, at step 640, if the selected channel feed is digitally encoded, program data and channel data are provided via signal CDS from the programable sequencer 330 (shown in FIG. 2) to the buffer/combiner 350 (shown in FIG. 2) and added to the encoded data stream in the extension and user data 520 (shown in FIG. 4) of the encoded data stream as described above. At step 645, the selected MPEG channel feed (data stream STREAM1) is spliced into the data stream STREAM2 provided from MPEG encoder 340 by buffer/combiner 350 to produce the channel surfing channel feed CSCF.

At step 650, it is determined whether the present time period T has elapsed. If the present time period has not elapsed, step 645 is repeated. Otherwise, at step 655, the next channel feed is selected. At step 660, it is determined whether the next selected channel feed is analog or digitally encoded. Step 610 is repeated if the signal is analog. Step 640 is repeated if the selected channel feed is digitally encoded.

Figure 7:
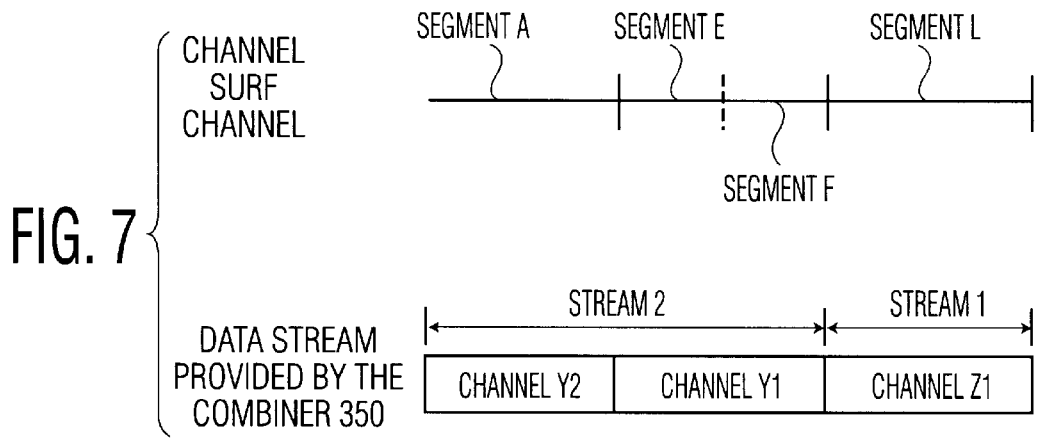
FIGS. 7 and 8 are timing diagrams useful for explaining the operation of the channel surfing signal generator shown in FIG. 2.
Figure 8:
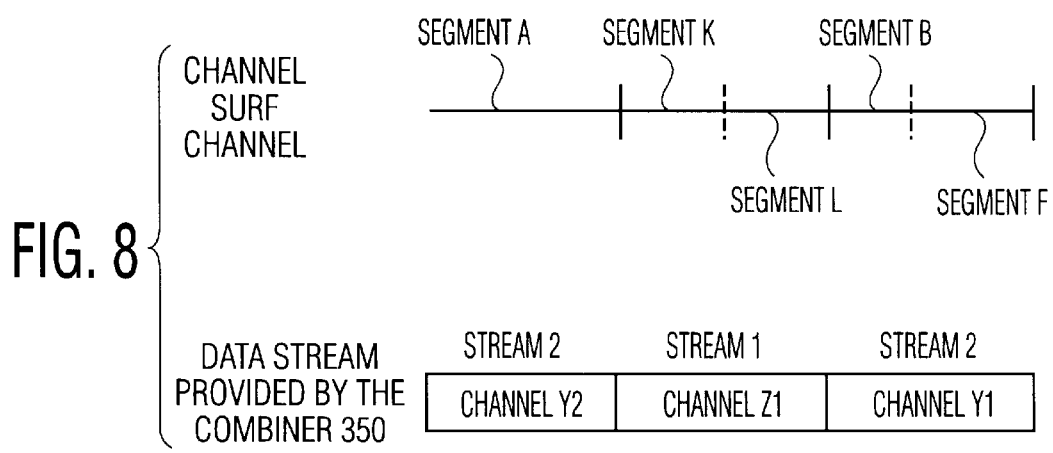

FIGS. 7 and 8 are diagrams useful for illustrating the operation of the channel surfing signal generator 110. In FIG. 7, the pictures being displayed by the channel surfing channel are shown as segment A, segment E, segment F, and segment L. Each segment corresponds to video from different ones of the channel feeds. Also shown are data streams STREAM1 and STREAM2 produced by the combiner/buffer 350 which form the channel surfing channel feed produced by the buffer/combiner 350. As is demonstrated in FIG. 7, segment A corresponds to the video provided from channel feed Y2, segments E and F correspond to the video provided from channel feed Y1, and segment L corresponds to the video provided from channel feed Z1. Thus, the pictures to be displayed on the channel surfing channel appear in the order of channel feed Y2, channel feed Y1, and channel feed Z1 or segment A, segment E, segment F, and segment L.

FIG. 8 shows an alternative example of the segments displayed on the channel surfing channel. In this example, the channel surfing channels displays segment A, segment K, segment L, segment E, and segment F, in that order. The corresponding data streams are also shown in FIG. 7. The pictures to be displayed are from of channel feed Y2, channel feed Z1, and channel feed Y1 or segment A, segment K, and segment E.

Figure 15:
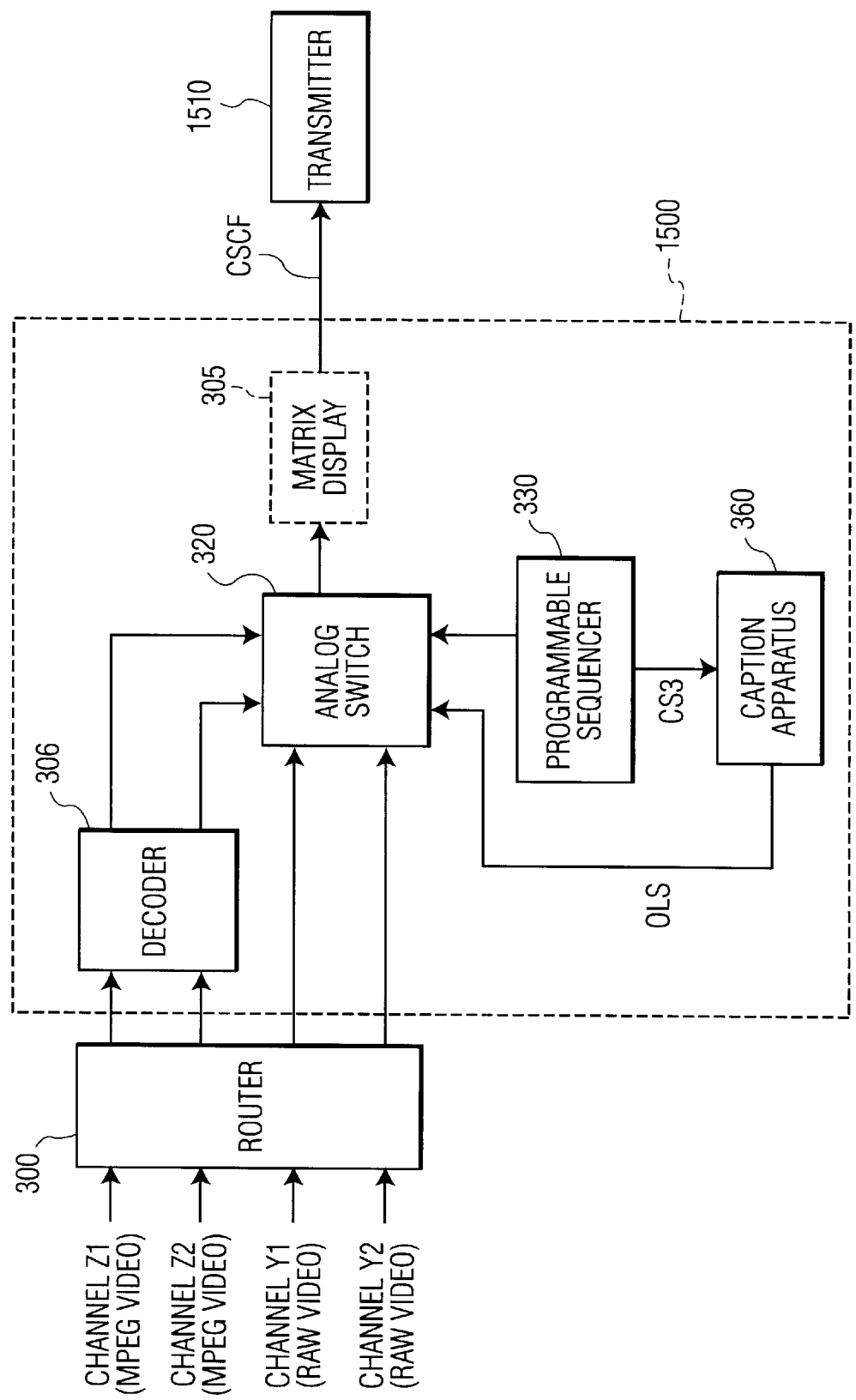
FIG. 15 is a block diagram of a channel surfing signal generator that generates a time-multiplexed channel surfing signal according to another exemplary embodiment of the present invention.

FIG. 15 is a block diagram of a channel surfing signal generator 1500 that generates a time-multiplexed channel surfing signal according to another exemplary embodiment of the present invention. In this embodiment, the channel surfing generator 1500 produces an analog channel surfing channel that is transmitted from the head-end by transmitter 1510 as an analog signal as is well known. The components of the channel surfing channel generator 1500 having like reference numerals operate in the same manner as the components of the channel surfing channel generator 110. The channel surfing channel generator 1500 converts each of the channel feeds Z1 and Z2 to analog signals and produces the channel surfing channel feed CSCF using switch 320. The analog channel feed is broadcast by transmitter 1510.

Figure 16:
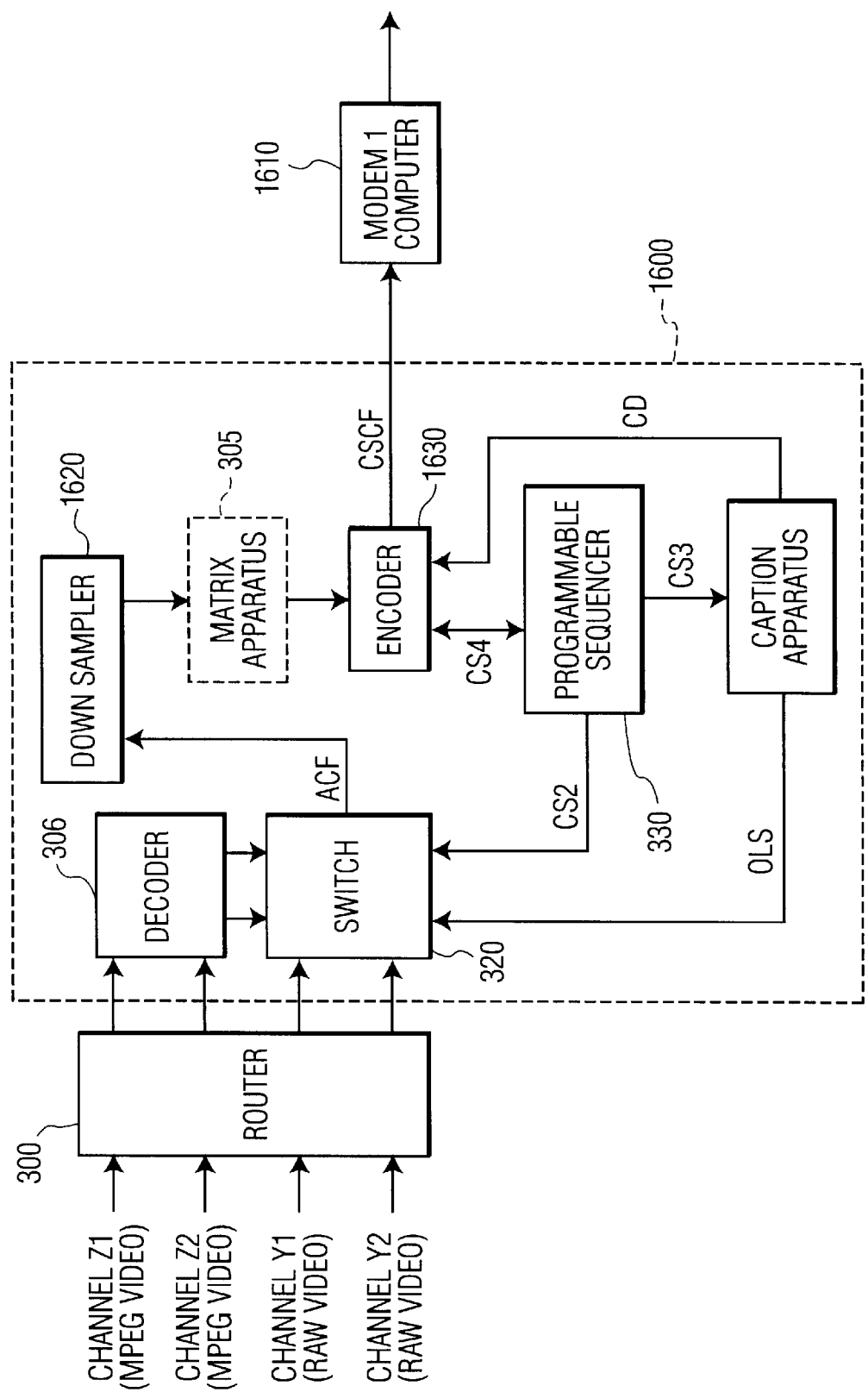
FIG. 16 is a block diagram of a channel surfing signal generator that generates a time-multiplexed channel surfing signal according to another exemplary embodiment of the present invention.

FIG. 16 is a block diagram of a channel surfing channel generator 1600 that generates a time-multiplexed channel surfing signal according to another exemplary embodiment of the present invention. In this embodiment, the channel surfing generator 1600 produces a reduced bandwidth digital signal for transmission via modem or over the internet from the head-end using a computer 1610 as is well known. The components of the channel surfing channel generator 1600 having like reference numerals operate in the same manner as the components of the channel surfing channel generator 110. The channel surfing channel generator 1600 converts, if necessary, the channel feeds to analog signals using decoder 306. The analog signals ACF provided by the switch 320 are down sampled by down sampler 1620 to reduce the bandwidth. The down sampled images are digitally encoded by the encoder 1630 which may be an MPEG encoder such as encoder 340. The encoded channel surfing channel feed is transmitted via a modem or placed on a computer for access through, for example, a computer network such as a web-site on the Internet. The channel surfing channel is available on-demand in real time.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. Apparatus comprising:
   means for receiving at least a first channel feed and a second channel feed;
   selecting means for selecting full resolution first multi-frame segments of the first channel feed and full resolution second multi-frame segments of the second channel feed;
   combining means for repetitively splicing the first full resolution multi-frame segments with the full resolution multi-frame second segments to produce a single television program signal containing a time-division multiplexed combined channel feed that provides each of the first and second full resolution multi-frame segments for display at a respectively different time; and
   transmitting means for transmitting the first channel feed, the second channel feed, and the single television program signal containing the combined channel feed.

2. The apparatus according to claim 1 wherein the selecting means, the combining means, and the transmitting means are located at a head-end of a transmission system.

3. The apparatus according to claim 1 wherein the transmitting means transmits the single television program signal containing the combined channel feed as a digital signal.

4. The apparatus according to claim 1 wherein the transmitting means transmits the single television program signal containing the combined channel feed as an analog signal.

5. The apparatus according to claim 1 wherein the transmitting means transmits the single television program signal containing the combined channel feed via a computer network.

6. The apparatus according to claim 1 wherein the first channel feed is an analog signal and the second channel feed is a compressed digitally encoded signal.

7. The apparatus according to claim 6 further comprising encoding means for compressing and digitally encoding the first channel feed.

8. The apparatus according to claim 1 further comprising means for adding program data to the single television program signal containing the combined channel feed, the program data describing the selected channel feeds.

9. The apparatus according to claim 1 further comprising means for adding channel data to the single television program signal containing the combined channel feed, the channel data including instructions for controlling a receiver.

10. The apparatus according to claim 1 further comprising a receiver which receives the single television program signal containing the combined channel feed.

11. Apparatus comprising:
    means for receiving an analog channel feed and a full resolution first compressed digital channel feed;
    encoding means for digitally encoding and compressing the analog channel feed to produce a full resolution second compressed digital channel feed;
    combining means for splicing portions of the full resolution first compressed digital channel feed and portions of the full resolution second compressed digital channel feed to produce a single television program signal containing a combined channel feed that provides each of the first and second full resolution multi-frame segments for display at a respectively different time; and
    transmitting means for transmitting the single television program signal containing the combined channel feed, the first compressed digital channel feed, and the second compressed digital channel feed as respective single channel signals.

12. The apparatus according to claim 11 wherein the encoding means, the combining means, and the transmitting means are located at a head-end of a transmission system.

13. The apparatus according to claim 11 wherein the transmitting means transmits the single television program signal containing the combined channel feed as a digital signal.

14. The apparatus according to claim 11 wherein the transmitting means transmits the single television program signal containing the combined channel feed via a computer network.

15. The apparatus according to claim 11 further comprising means for adding program data to the single television program signal containing the combined channel feed describing the selected channel feeds.

16. The apparatus according to claim 11 further comprising means for adding channel data to the single television program signal containing the combined channel feed, the channel data including instructions for controlling a receiver.

17. The apparatus according to claim 11 further comprising receiving means for receiving the single television program signal containing the combined channel feed.

18. The apparatus according to claim 17 wherein the transmitting means includes means for adding channel data to the single television program signal containing the combined channel feed, the channel data including instructions for controlling the receiver; the apparatus further comprising:
    means for displaying the single television program signal containing the combined channel feed, the first digital signal, and the second digital signal; and
    means for switching from the display of the single television program signal containing the combined channel feed to the first digital signal or the second digital signal in response to the channel data.

19. A method comprising the steps of:
    (a) receiving at least two channel feeds;
    (b) splicing a full-resolution multi-frame segment from the first channel feed with a full-resolution multi-frame segment from the second channel feed to produce a single television program signal containing a time-division multiplexed combined channel feed that provides each of the first and second full resolution multi-frame segments for display at a respectively different time;
    (c) repeating step (b); and
    (d) transmitting the at least two channel feeds and the single television program signal containing the combined channel feed.

20. The method according to claim 19 wherein step (d) further includes the step of transmitting the single television program signal containing the combined channel feed as a digital signal.

21. The method according to claim 19 wherein step (d) further includes the step of transmitting the single television program signal containing the combined channel feed as an analog signal.

22. The method according to claim 19 wherein step (d) further includes the step of transmitting the single television program signal containing the combined channel feed via a computer network.

23. The method according to claim 19 wherein step (c) further comprises the step of continuously repeating step (b).

24. A method comprising the steps of:
   (a) receiving an analog channel feed and a full resolution first digital channel feed;
   (b) digitally encoding and compressing the analog channel feed to produce a full resolution second digital channel feed;
   (c) splicing portions of the full resolution first digital channel feed and portions of the full resolution second digital channel feed to produce a single television program signal containing a combined channel feed that provides each of the first and second full resolution digital channel feeds for display at a respectively different time; and
   (d) transmitting the single television program signal containing the combined channel feed, the first digital channel feed, and the second digital channel feed.

25. The method according to claim 24 further comprising the step of (e) adding program data to the single television program signal containing the combined channel feed describing the first and second digital channel feeds.

26. The method according to claim 24 further comprising the step of (e) adding channel data to the single television program signal containing the combined channel feed, the channel data including instructions for controlling a receiver.

27. The method according to claim 24 further comprising the step of (e) receiving the single television program signal containing the combined channel feed.

* * * * *